United States Patent [19]
Edler et al.

[11] Patent Number: 5,511,093
[45] Date of Patent: Apr. 23, 1996

[54] METHOD FOR REDUCING DATA IN A MULTI-CHANNEL DATA TRANSMISSION

[75] Inventors: Bernd Edler; Hendrik Fuchs, both of Hannover, Germany

[73] Assignee: Robert Bosch GmbH, Stuttgart, Germany

[21] Appl. No.: 238,107

[22] Filed: May 4, 1994

[30] Foreign Application Priority Data

Jun. 5, 1993 [DE] Germany .......................... 43 18 763.3
Jun. 24, 1993 [DE] Germany .......................... 43 20 990.4

[51] Int. Cl.$^6$ .............................. H04B 1/66; H04N 7/12
[52] U.S. Cl. ............................ 375/240; 370/118; 381/29; 348/409
[58] Field of Search ................................ 375/27, 31, 244, 375/250, 240, 241; 364/715.02; 341/109; 370/118; 381/29, 30; 395/2.1, 2.25, 2.27, 2.28; 348/409, 423

[56] References Cited

U.S. PATENT DOCUMENTS

| | | | |
|---|---|---|---|
| 4,141,034 | 2/1979 | Netravali et al. | 375/244 |
| 4,815,132 | 3/1989 | Minami | 381/1 |
| 4,975,958 | 12/1990 | Hanada et al. | 381/36 |
| 5,253,275 | 10/1993 | Yurt et al. | 375/240 |

FOREIGN PATENT DOCUMENTS

WO90/16136 12/1990 WIPO.

OTHER PUBLICATIONS

D. Bauer et al., "Statistical Properties of High Quality Stereo Signals in The Time Domain," International Conference on Acoustics, Speech, and Signal Processing, vol. 3, pp. 2045–2048 (1989).
S. Minami et al., "Stereophonic ADPCM Voice Coding Method." International Conference on Acoustics, Speech, and Signal Processing, vol. 2, pp. 1113–1116 (1990).
James D. Johnston, Perceptual Transform Coding of Wideband Stereo Signals; IEEE, Feb. 1989, pp. 1993–1996.
Robbert G. van der Waal et al., Subband Coding of Stereophonic Digital Audio Signals, IEEE, Jul. 1991, pp. 3601–3604.
Hendrik Fuchs, Report on the MPEG/Audio Subjective Listening Tests in Hannover, Nov. 1991.

*Primary Examiner*—Stephen Chin
*Assistant Examiner*—Jeffrey Gluck
*Attorney, Agent, or Firm*—Kenyon & Kenyon

[57] ABSTRACT

In a method for reducing data in a multi-channel data transmission, existing cross-relations between the signal channels are determined with due consideration of the transit-time difference. Upon the data transmission, a signal channel, the predictor coefficients and transit-time differences obtained from the cross-relations ascertained, and the prediction error are transmitted. At the receiver, the signal of the second channel is reconstructed from the transmitted signal channel, the predictor coefficients, the transit-time difference, and the prediction error. In this way, the amount of data to be transmitted in the case of multi-channel video or audio signals is reduced.

8 Claims, 1 Drawing Sheet

METHOD FOR REDUCING DATA IN A MULTI-CHANNEL DATA TRANSMISSION

FIELD OF THE INVENTION

The present invention relates to multi-channel data transmission, and in particular to a method for reducing the amount of data in a multi-channel data transmission.

BACKGROUND INFORMATION

Methods for reducing stereo redundance are known from J. D. Johnston, "Perceptual Transform Coding of Wideband Stereo Signals," Proc. of the ICASSP 1990, and from R. G. van der Waal, R. N. J. Valdhuis, "Subband Coding of Stereophonic Digital Audio Signals," Proc. of the ICASSP 1991, but only statistical dependences of the scanned values occurring at the same time in both channels are used therein.

SUMMARY OF THE INVENTION

The present invention provides a method for reducing data in a multi-channel data transmission. In particular, in an embodiment of the method according to the present invention, existing cross-relations between the signal channels are determined with due consideration of the transit-time differences. Upon the data transmission, a signal channel, the predictor coefficients and transit-time differences obtained from the cross-relations ascertained, and the prediction error are transmitted. At the receiver, the signal of the second channel is reconstructed from the transmitted signal channel, the predictor coefficients, the transit-time difference, and the prediction error.

Because existing cross-correlations taking into account the differences in transit time are utilized for the adaptive interchannel predicting, the data reduction factor is increased, i.e. the data redundancy is reduced. The result is that a better quality is obtained with the same reduction factor, or a higher reduction factor is obtained for the same quality.

DETAILED DESCRIPTION

Figure 1:
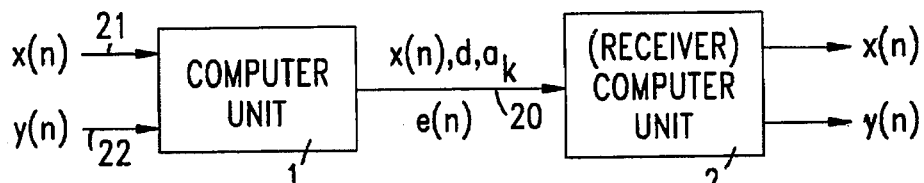
FIG. 1 shows a two-channel transmission system.

FIG. 1 shows two signal channels. The first signal channel contains the signal x(n) scanned at the scanning times n, this signal being fed via a data line 21 to a computer unit 1 with memory. The second signal channel contains the signal y(n) scanned at the scanning times n, this signal being fed via a further data line 22 to the computer unit 1.

The computer unit 1, as will be explained in further detail below, determines an estimated value y' (n) for the actual scanning value y(n) of the second channel from the actual and preceding scanning values of the signal x(n), using a transit-time compensation by the transit-time difference d between the two signals x(n) and y(n), as well as a prediction with the predictor coefficients $a_k$. Thereupon, the prediction error e(n) is calculated, it resulting as a difference between the actual scanning value y(n) and the estimated value y' (n) and, therefore, e(n)=y(n)−y' (n). The computer unit 1 passes the scan signal x(n) of the first channel, the transit-time difference (delay) d, the predictor coefficients $a_k$, and the prediction error e(n) via a data line 20 to a (receiver) computer unit 2. The data transmission can, however, also take place via electromagnetic waves.

The computer unit 2 reconstructs the signal y(n) of the second channel from the scanned signal x(n) of the first channel, the delay d, the predictor coefficients $a_k$, and the prediction error e(n), and transmits this signal together with the scanned signal x(n) for further processing.

Figure 2:
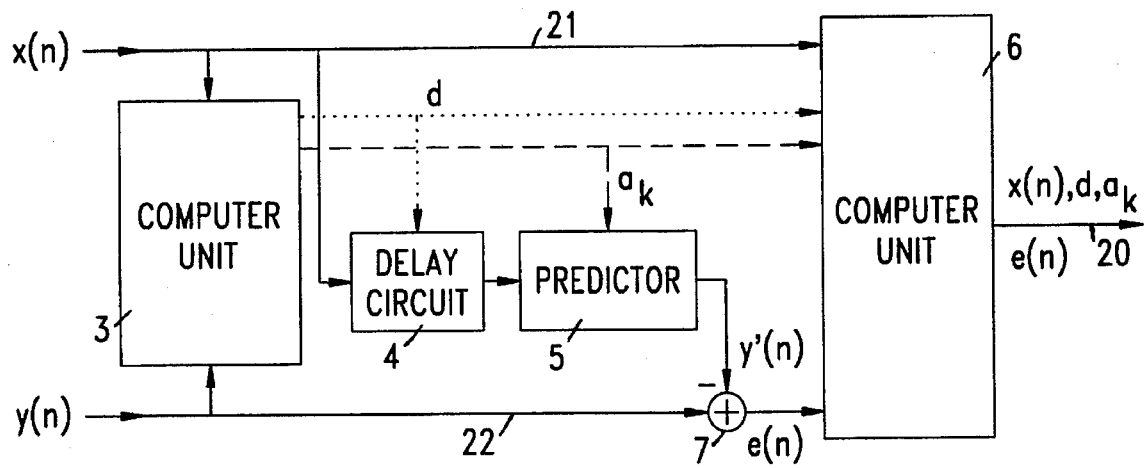
FIG. 2 is a block diagram of an adaptive inter-channel predictor according to the present invention.

In FIG. 2, the adaptive inter-channel prediction contained in the computer unit 1 is diagrammatically shown. As will be explained further below, the optimal prediction coefficients $a_k$ and the optimal d are determined in a computer unit 3 for blocks of, in each case, N successive scan values of the signals x(n) and y(n) and forwarded to the delay circuit 4 and/or the predictor 5 and to the computer unit 6. The scanned signal x(n) is fed to the delay circuit 4 and to the predictor 5. In this way, in accordance with formula (1), given in the specification, an estimated value y' (n) is calculated for the actual scanned value y(n) of the second channel. The estimated value y' (n) and the actual scanned value y(n) are fed to an adder 7, the estimated value y' (n) being provided with a negative sign. From the addition of the estimated value y' (n) and the actual scanned value y(n), the prediction error e(n) is determined in accordance with formula (2) and then also sent to the computer unit 6.

Within the computer unit 6, the further processing necessary for the transmission takes place, for example coding and multiplexing, which lies outside the adaptive inter-channel prediction and will not be discussed further here. The computer unit 6 finally transmits the scanned signal x(n), the delay d, the predictor coefficients $a_k$, and the prediction error to the receiver via a data line 20.

The determination of the optimal predictor coefficients $a_k$ for a block of, in each case, N successive scanned values and of the optimal transit-time difference d is effected in the computer unit 3 by minimizing the prediction error output. In this connection, the prediction error output is calculated using the procedure indicated in Formula (10), provided below, in accordance with Formulas (4), (5), (6), (7) and (8), provided below, the prediction error output being minimized with variation of the delay d and of the predictor coefficients $a_k$.

Figure 3:
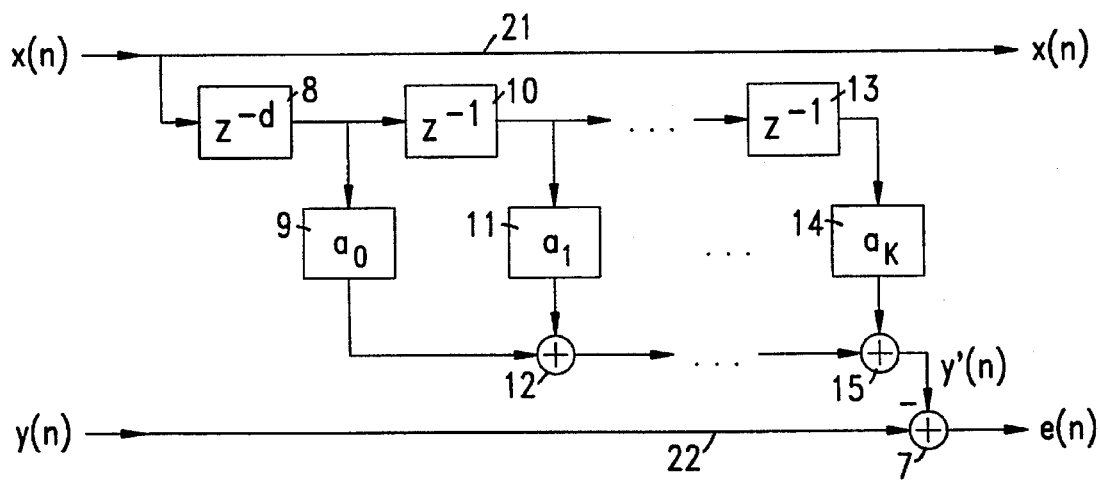
FIG. 3 shows an embodiment of the inter-channel predictor according to the present invention.

FIG. 3 shows a concrete embodiment of the inter-channel predictor, which includes the delay circuit 4 and the predictor 5. The scanned signal value x(n) of the first channel 21 is fed to a first delay circuit 8. The delay circuit 8 feeds the scanned signal value x(n) for a fixed number of scanning cycles, the so-called transit-time difference d. Thereupon, the signal value x(n−d) is fed to a second delay circuit 10 and a zero-order multiplier 9.

In the zero-order multiplier 9, the signal value x(n−d) is multiplied by a predictor coefficient $a_0$ and forwarded to a first adder 12. The signal value x(n−d) for a scanning cycle is stored in the second delay circuit 10, and the signal value x(n−d−1) is thereupon fed to a first multiplier 11 and to a further delay circuit, which is indicated in the form of dots in FIG. 3. The first multiplier 11 multiplies the signal value x(n−d−1) by a first predictor coefficient $a_1$ and forwards the product to the first adder 12.

The first adder 12 adds the product (x(n−d)*$a_0$) fed by the zero-order multiplier 9 to the product (x(n−d−1)*$a_1$) fed by the first multiplier 11 and conducts the sum to a further adder, which is shown in the form of dots in FIG. 3. By means of this arrangement, the sum represented in Formula (1), which represents the estimated value y' (n), for the actual scanning value of the signal y(n) is realized. Between the first delay circuit 10 and the k-th delay circuit 13 there are K-2 further delay circuits.

Each of the delay circuits is connected with a multiplier which multiplies the time-delayed signal by a predictor coefficient and forwards it to an adder. The adder totals the product fed by the multiplier with the sum ascertained by a preceding adder and forwards this sum to another adder. Therefore K-branches are present which are constructed similar to the delay circuit 10, which is connected to the multiplier 11, which is in turn connected to the adder 12.

In the last branch K, the signal fed from a preceding delay circuit is stored in a K-th delay circuit 13 for a scanning cycle and the signal x(n−d−K) is fed to a K-th multiplier 14. The K-th multiplier 14 multiplies the signal fed to it by a K-th prediction coefficient $a_K$ and forwards the product $(x(n-d-K) * a_K)$ to a K-th adder 15.

The K-th adder 15 adds the product which has been fed by the K-th multiplier 14 and the sum which has been determined by a (K-1)-th adder to form an estimated value y' (n), which is represented in the formula (1). The K-th adder 15 forwards the estimated value y' (n) to the adder 7. The adder 7 determines the prediction error e(n) from the actual scanned value of the signal y(n) and the estimated value y' (n). The computer unit 1 with memory now optimizes the prediction error e(n).

The method diagrammatically shown in FIG. 3 for determining the prediction error e(n) with the use of the predictor coefficients $a_k$ and the transit-time difference (delay) d is carried out, in the same way as the above-described determination of the optimal delay d and the optimal predictor coefficient $a_k$, by the computer unit 1 with memory.

The predictor 5 is preferably implemented as a Fast Impulse Response (FIR) filter structure, known from Kammeyer "Nachrichtentechnik", Teubner Stuttgart, 1992, p. 487.

The method of adaptive inter-channel prediction proposed here makes redundancy reduction possible upon the coding of multi-channel video and audio signals by the use of the statistical relationships existing between the channels when they are coded jointly rather than independently from each other.

The coding of stereo audio signals is known from the proposed ISO/IEC Standard called MPEG/Audio (ISO/IEC, "Draft International Standard DIS 11172; Information technology—coding of moving pictures and associated audio for digital storage media at up to about 1.5 Mbit/s", ISO/IEC JTC1/SC29/WG11, Geneva, April 1992). The method of stereo redundancy reduction used there is based on the articles published in J. D. Johnston, "Perceptual Transform Coding of Wideband Stereo Signals," Proc. of the ICASSP 1990, and in R. G. van der Waal, R. N. J. Valdhuis, "Subband Coding of Stereophonic Digital Audio Signals," Proc. of the ICASSP 1991.

A stereo audio signal is characterized, in particular, by the fact that the signals from different sound sources occur in the two channels at different times and with different levels, which is only inadequately taken into account in all methods known today, since only the statistical dependencies between the two simultaneous scanned values of the left-hand and right-hand channels are utilized therein. The improved formulation, the so-called adaptive inter-channel prediction, contains a transit-time compensated prediction of higher order by which it is possible to calculate, from the scanned values of the signal in one channel, an estimated value for the actual scanned value in the other channel. In an entirely analogous manner, this formulation can be transformed for signals with more than two channels. FIG. 2 shows the block diagram and FIG. 3 an embodiment of the inter-channel predictor.

From several successive scanned values of the signal x(n) in each channel, the estimated value $$y'(n) = \sum_{k=0}^{K} a_k \cdot x(n-d-k) \quad (1)$$

for the actual scanned value of the signal y(n) in the other channel is calculated. In this equation, K is the degree of the predictor, $a_k$ the predictor coefficient, and d a delay which permits an equalizing of transit-time differences. The prediction error is $$e(n) = y(n) - y'(n) \quad (2)$$

The variance of the prediction error signal e(n) is reduced compared with the variance of the signal y(n). If, instead of the signal y(n), the prediction error signal e(n) is coded and transmitted, the data rate is reduced. Without limiting the generality, it is assumed that x(n), y(n), y' (n) and e(n) are stationary and zero mean. The gain in prediction $$G = \frac{E[y^2(n)]}{E[e^2(n)]} = \frac{\sigma_y^2}{\sigma_e^2} \quad (3)$$

for a predetermined delay d, the optimal predictor coefficients $a_k$ can be calculated by minimizing the variance of the prediction error signal $\sigma_e^2 = E[e^2(n)]$. This leads to the following linear equation system $$\sum_{k=0}^{K} a_k \cdot r_{k,i} \cdot \sigma_{xk} = c_i \cdot \sigma_y \quad ; \quad 0 \leq i \leq K \quad (4)$$

in which $$\sigma_{xk}^2 = E[x^2(n-d-k)] \quad (5)$$

is the variance of the scanned value of the signal x(n), $$r_{k,i} = r_{i,k} = \frac{E[x(n-d-k)x(n-d-i)]}{\sigma_{xk} \cdot \sigma_{xi}} \quad (6)$$

are the autocorrelation coefficients of the scanned values of the signal x(n), and $$c_i = \frac{E[y(n)x(n-d-i)]}{\sigma_y \cdot \sigma_{xi}} \quad (7)$$

are the cross-correlation coefficients between the scanned values of the signals x(n) and y(n).

For the optimal predictor coefficients $a_k$, the prediction error output $$\sigma_e^2 = \sigma_y^2 - \sigma_y \cdot \sum_{k=0}^{K} a_k \cdot c_k \cdot \sigma_{xk} \quad (8)$$

becomes minimum, and the prediction gain $$G = \frac{1}{1 - \frac{1}{\sigma_y} \cdot \sum_{k=0}^{K} a_k \cdot c_k \cdot \sigma_{xk}} \quad (9)$$

becomes maximum for the predetermined value of the delay d.

The delay d can, for instance, be the estimated value, determined from a prior analysis, for the transit-time difference between the signals x(n) and y(n). The maximum gain in prediction can be obtained by simultaneously optimizing the predictor coefficients $a_k$ and the delay d.

With non-steady input signals, the optimal predictor parameters are dependent on the actual signal properties, i.e. are time variant. Therefore, it is advantageous to adapt the predictor to the actual signal properties. This can be done by effecting the coding of the signals x(n) and y(n) in blocks {x(mN) . . . x(mN+N−1)} and {y(mN) . . . y(mN+N−1)}, respectively, and calculating the corresponding optimal predictor parameters with the use of the short-time average values $$\frac{1}{N} \cdot \sum_{j=0}^{N-1} f(mN+j) \qquad (10)$$

instead of the expectation values E[f(mN)].

In this way, the prediction error output for each block is minimized. For each block, then, the predictor parameter must also be transmitted in addition to the signal x(n) and the prediction error signal e(n).

In order to increase the efficiency of the adaptive inter-channel prediction, it is not applied to the wide-band input signal but rather to narrow-band spectral components. In this connection, the fact is made use of that the prediction is particularly effective in the case of individual tonal signal components. With the application of the adaptive inter-channel prediction to narrow-band spectral components, assurance is had, on the one hand, that only individual or a few tonal signal components are contained in a spectral component, and thus predictors of lower order can be used. Furthermore, in this way, the predictor parameters can be adapted to the signal-dependent distribution of the tonal signal components in the spectral range, so that the prediction can be disconnected, for instance, in spectral components which do not contain any tonal signal components.

In a first step, the adaptive inter-channel prediction was integrated in an ISO MPEG Layer II Codec (ISO/IEC, "Draft International Standard DIS 11172; Information technology—coding of moving pictures and associated audio for digital storage media at up to about 1.5 Mbit/s", ISO/IEC JTC1/SC29/WG11, Geneva, April 1992), where the spectral components are obtained by means of a uniform filter bank with 32 individual bands. In this case, x(n) and y(n) are the underscanned signals of the stereo signal in the i-th individual band. For x(n)=1(n) and y(n)=r(n), the prediction takes place from the left signal to the right signal. If one changes the ascription, the reverse direction of prediction results. The predictor coefficients $a_k$ and the delay d are determined in each case for short time intervals (T=24 ms). One special feature of the adaptive inter-channel predictor is that the predictor structure is a FIR structure both in the encoder and in the decoder, and no transient or stability problems therefore occur. This is important, in particular, when it is desired to commence the decoding at any desired point.

Instead of x(n) and y(n), x(n) and e(n) must be coded and transmitted here. Furthermore, the additional information necessary for the predictor (delay d, predictor coefficients $a_k$) must be transmitted. The prediction direction, i.e. the ascription of 1 (n) and r(n) to x(n) and y(n), can be fixed or variable and must then also be transmitted. The quantified values of x(n) are used as input values of the predictor in the encoder. In this way, assurance is had that the predictors process the same input signals both in the encoder and in the decoder. The quantification errors of the signal y(n) are thus identical to those of the prediction error signal e(n). Otherwise, there would be an additional superimposing of the quantification errors of the signal x(n).

Initial investigations have shown that large gains in prediction result, in particular for a class of test signals which proved particularly critical in the listening test (H. Fuchs, "Report on the MPEG/Audio subjective listening tests in Hannover", ISO/IEC JTC1/SC29/WG11: Doc. No. MPEG 91/331, November 1991) carried out during the ISO standardization (test signals with individual instrument characteristics which have a very large number of total spectral components of, in part, relatively high energy also in the upper frequency range such as, for instance, clarinets or harpsichords). For the "clarinet" test signal, there were obtained, for instance, in individual partial bands over large signal sections, gains in prediction within the range of between 30 and 40 dB, which leads to a definite improvement in the audio quality. The gain in prediction is primarily concentrated on the lower 6–12 individual bands. With different test signals, average prediction gains in these lower individual bands were found to be between 3 and 16 dB, while in the upper individual bands it is less than 3 dB; averaged over the entire signal, the gain in prediction is between 1.5 and 6.5 dB.

One feature of the adaptive inter-channel prediction resides in the fact that large gains in prediction are obtained in particular in those signal sections which are particularly difficult to code, and therefore require a very large number of data rates.

What is claimed is:

1. A method for reducing data in a data transmission of at least first and second channels, comprising the steps of:

dividing the first channel into a plurality of first spectral components and dividing the second channel into a plurality of second spectral components, the first and second channels using common coding;

determining a statistical time-shifted cross-relation between at least one of the plurality of first spectral components and at least one of the plurality of second spectral components;

determining at least one predictor coefficient and a transmit-time difference between the at least one first spectral component and the at least one second spectral component based upon the cross-relation;

determining a prediction error, e(n), as a function of one of the at least one first spectral component and the at least one second spectral component;

transmitting the at least one first spectral component, the prediction error e(n), the at least one predictor coefficient, and the transmit-time difference to a receiver; and reconstructing, at the receiver, the at least one second spectral component based upon the at least one first spectral component, the prediction error, the at least one predictor coefficient, and the transmit-time difference.

2. The method according to claim 1, wherein the first and second channels are selected from the group including audio channels and video channels.

3. The method according to claim 1, wherein the cross-relation is a statistical correlation.

4. The method according to claim 1, further comprising the step of determining an estimated value y' (n) of the at least one second spectral component in accordance with the following formula:

$$y'(n) = \sum_{k=0}^{K} a_k * x(n-d-k),$$

wherein n is a scanning time, $a_k$ is the at least one predictor coefficient, d is the transmit-time difference over a plurality of scanning cycles, k is a counter, K is a fixed number which determines a predictor degree, and x(n−d−k) is a scanned value of the at least one first spectral component at the scanning time (n–d–k).

5. The method according to claim 4, further comprising the steps of:

comparing the estimated value y' (n) of the at least one second spectral component with a scanned value y(n) of the at least one second spectral component;

determining the prediction error e(n) based upon the comparison; and optimizing the at least one predictor coefficient $a_k$ and the transit-time difference d by minimizing a mean square $\sigma_e^2$ of the prediction error e(n).

6. The method according to claim 1, further comprising the step of determining a prediction direction, the prediction direction being determined as a function of an ascription of the first and second channels.

7. The method according to claim 1, further comprising the steps of:

determining a prediction direction for the at least one first spectral component and the at least one first spectral component and the at least one second spectral component, the prediction direction being determined as a function of an ascription of the first and second channels; and transmitting the prediction direction to the receiver, wherein the step of reconstructing further includes reconstructing the at least one second spectral component based upon the prediction direction.

8. The method according to claim 1, further comprising the step of stopping the determination of the at least one predictor coefficient when one of the at least one first spectral component and the at least one second spectral component includes no tonal signal.

* * * * *

UNITED STATES PATENT AND TRADEMARK OFFICE
CERTIFICATE OF CORRECTION

PATENT NO. : 5,511,093
DATED : April 23, 1996
INVENTOR(S) : Bernd EDLER et al.

It is certified that error appears in the above-identified patent and that said Letters Patent is hereby corrected as shown below:

| Column | Line | |
|---|---|---|
| 2 | 54 | Change "$a_0$and" to --$a_0$ and--. |
| 3 | 16 | Change "$a_K$and" to --$a_K$ and--. |
| 4 | 26 | Before "for" insert --is determined by the ratio of the variances.--; start new paragraph and change "for" to --For--. |
| 8 | 2 | Delete "and the at least one first spectral" |
| 8 | 3 | Delete "component". |

Signed and Sealed this

Twenty-sixth Day of November 1996

Attest:

BRUCE LEHMAN

Attesting Officer

Commissioner of Patents and Trademarks